US011830025B2

(12) United States Patent
Stuckey et al.

(10) Patent No.: US 11,830,025 B2
(45) Date of Patent: Nov. 28, 2023

(54) SYSTEM AND METHOD FOR GENERATING A PERSONALISED MMS MESSAGE HAVING A REDEEMABLE COMPONENT

(71) Applicant: Mobile Digital IP Pty Ltd., Newcastle (AU)

(72) Inventors: John Rex Milton Stuckey, Ashmore (AU); Eibhlis Aine Ros Stuckey, Ashmore (AU)

(73) Assignee: Mobile Digital IP Pty Ltd., Newcastle (AU)

( * ) Notice: Subject to any disclaimer, the term of this patent is extended or adjusted under 35 U.S.C. 154(b) by 37 days.

(21) Appl. No.: 17/331,710

(22) Filed: May 27, 2021

(65) Prior Publication Data

US 2021/0287243 A1 Sep. 16, 2021

Related U.S. Application Data

(63) Continuation of application No. 15/760,226, filed as application No. PCT/AU2016/050869 on Sep. 16, 2016, now abandoned.

(30) Foreign Application Priority Data

Sep. 16, 2015 (AU) ............................ 2015903767
May 27, 2016 (AU) ............................ 2016902022

(51) Int. Cl.
*G06Q 30/02* (2023.01)
*G06Q 30/0207* (2023.01)
(Continued)

(52) U.S. Cl.
CPC ..... *G06Q 30/0225* (2013.01); *G06Q 20/4016* (2013.01); *G06Q 30/02* (2013.01);
(Continued)

(58) Field of Classification Search
CPC .................. G06Q 30/0207–30/0277
(Continued)

(56) References Cited

U.S. PATENT DOCUMENTS

| 7,430,520 B1 * | 9/2008 | Haugen .................. G06Q 30/02 |
| | | 235/382 |
| 9,088,892 B1 * | 7/2015 | Cham .................. H04L 63/0876 |
| 2009/0182634 A1 * | 7/2009 | Park ........................ G06Q 20/32 |
| | | 705/14.36 |
| 2011/0145564 A1 * | 6/2011 | Moshir ............... H04L 63/0464 |
| | | 713/154 |

(Continued)

FOREIGN PATENT DOCUMENTS

WO  WO 2005/117469 A1 *  4/2005 ............ H04W 88/18

*Primary Examiner* — David J Stoltenberg
(74) *Attorney, Agent, or Firm* — David Meibos; Maywood IP Law

(57) ABSTRACT

A method for generating a unique and personalised MMS message having a redeemable component enables the instant delivery and receipt of individual and personalised, trackable, rich media messages direct to any mobile user. The method includes receiving, at a server from a first computing device, a selection of an MMS message product; receiving, at the server from the first computing device, a recipient contact identifier identifying a recipient mobile number; performing, via the server, a security verification of a recipient or sender based on the recipient mobile number or one or more details of the sender received from the first computing device; where the security verification is successful, generating, via the server, based on the selection of the MMS message product, a personalised MMS message having a redeemable component and a personalised image uniquely rendered for the recipient; and transmitting, the personalised MMS message to a recipient mobile computing device via a multimedia message service using the recipient mobile number; whereby the personalised MMS message is scannable or otherwise immediately redeemable from the recipient mobile computing device to pay for one or more products and/or services.

19 Claims, 13 Drawing Sheets

(51) Int. Cl.
  *G06Q 30/0251*  (2023.01)
  *G06Q 20/40*  (2012.01)
  *H04L 51/10*  (2022.01)
  *G06F 16/955*  (2019.01)
  *G06K 19/06*  (2006.01)
  *H04L 67/02*  (2022.01)
  *H04W 4/14*  (2009.01)

(52) U.S. Cl.
  CPC ..... *G06Q 30/0207* (2013.01); *G06Q 30/0267* (2013.01); *H04L 51/10* (2013.01); *G06F 16/9566* (2019.01); *G06K 19/06028* (2013.01); *G06K 19/06037* (2013.01); *H04L 67/02* (2013.01); *H04W 4/14* (2013.01)

(58) Field of Classification Search
  USPC .................................................. 705/14, 319
  See application file for complete search history.

(56) References Cited

U.S. PATENT DOCUMENTS

| | | | |
|---|---|---|---|
| 2012/0095814 A1* | 4/2012 | Liu | G06Q 30/02 705/14.1 |
| 2012/0330845 A1* | 12/2012 | Kang | G06Q 20/108 705/71 |
| 2013/0110722 A1* | 5/2013 | Boding | G06Q 20/4014 705/44 |
| 2013/0117646 A1* | 5/2013 | Hansen | G06Q 30/0238 715/205 |
| 2014/0025449 A1* | 1/2014 | Abifaker | G06Q 30/0214 705/14.16 |
| 2014/0046837 A1* | 2/2014 | Metral | G06Q 40/02 705/41 |
| 2015/0058242 A1* | 2/2015 | Bucciarelli | H04W 4/16 705/325 |
| 2016/0239859 A1* | 8/2016 | Yen | G06Q 30/0207 |

* cited by examiner

SYSTEM AND METHOD FOR GENERATING A PERSONALISED MMS MESSAGE HAVING A REDEEMABLE COMPONENT

CROSS-REFERENCE TO RELATED APPLICATIONS

The present application is a continuation of U.S. patent application Ser. No. 15/760,226 filed on Mar. 14, 2018 entitled, "System and Method for Generating a Personalised MMS Message Having A Redeemable Component", which is U.S. national stage filing under 35 U.S.C. § 371 of International Application No. PCT/AU2016/050869 filed on Sep. 16, 2016, entitled "System and Method for Generating a Personalised MMS Message Having A Redeemable Component", which claims the benefit of Australian Patent Application No. 2016902022 filed on May 27, 2016, and Australian Patent Application No. 2015903767 filed on Sep. 16, 2015. All of the foregoing are incorporated as though set forth herein in their entirety.

FIELD OF THE INVENTION

The present invention relates to a system and method for generating unique, personalised MMS messages having unique information content for the individual recipient. In particular, the present invention relates to generating digital images, value holding images such as gift cards, voucher, coupons, as well as unique advertisements or informational messages. The unique message can be scanned by an electronic reader device or is otherwise immediately redeemable buy the user from a mobile computing device.

BACKGROUND TO THE INVENTION

Typically, gift cards, also known as gift vouchers, tokens or certificates, have a monetary value that can be exchanged for goods and/or services at specific businesses. Many retailers offer gift cards in the form of a plastic debit card having a magnetic strip or electronic chip that can be swiped through a reader at a point of sale. A disadvantage of such plastic cards is that users must remember to carry the cards with them when shopping, and large collections of such cards can be cumbersome to store in a wallet or purse.

Some retailers offer Egift cards for sale online. These gift cards generally include a code that the user must click on to have the card delivered to their email address. The card is not delivered from the online purchaser of the online gift card. When the code is clicked a page displays a gift card number that is provided to the retailer, or a page including a barcode that can be printed out and scanned by the retailer. Some retailers also send a message via email or short message service (SMS) to a person for whom the gift card has been purchased, which provides a uniform resource locator (URL) link to a registration page to sign up and access a gift card.

While online gift cards can be easier to purchase, the above approaches can make online gift cards less convenient to use than plastic gift cards. In many instances Egift cards are not seen by the receiver, as they get mixed up in the bulk of promotional email that has become prevalent. Also, the registration processes required for online cards are often impersonal and time consuming, and there are also risks to the user by clicking on an unknown truncated link, which detract from the spontaneous and desirable excitement involved in giving and receiving a gift.

Further, online scam messages relating to online gift cards can also be sent to computing devices via email or SMS message, and can provide URL links which direct the computing device to viruses or other malware. This can deter users from trusting or opening emails or SMS messages relating to online gift cards, and can also result in emails concerning online gift cards being blocked by spam filters.

Other types of business to people (B2P) communications, such as electronic vouchers, coupons, advertisements and messages, also suffer from similar problems as those described above.

There is therefore a need for an improved method and system for generating a personalised MMS message having a redeemable component.

OBJECT OF THE INVENTION

It is a preferred object of the invention to provide an improved method and computer readable medium for generating a personalised MMS message having a redeemable component that addresses or ameliorates one or more of the aforementioned problems of the prior art or provides a useful commercial alternative.

SUMMARY OF THE INVENTION

The present invention relates to systems and methods for generating a fraud checked, personalised Multimedia Message Service (MMS) message having a redeemable component. In particular, the present invention relates to generating a personalised MMS message having a redeemable component that can be scanned from a mobile computing device.

In one form, although not necessarily the broadest form, the invention resides in a method for generating a personalised MMS message having a redeemable component, the method comprising:

receiving, at a server from a first computing device, a selection of an MMS message product;

receiving, at the server from the first computing device, a recipient contact identifier identifying a recipient mobile number;

performing, via the server, a security verification of a recipient or sender based on the recipient mobile number or one or more details of the sender received from the first computing device;

where the security verification is successful, generating, via the server, based on the selection of the MMS message product, a personalised MMS message having a redeemable component and a personalised image uniquely rendered for the recipient; and transmitting, the personalised MMS message to a recipient mobile computing device via a multimedia message service using the recipient mobile number;

whereby the personalised MMS message is scannable or otherwise immediately redeemable from the recipient mobile computing device to pay for one or more products and/or services.

Preferably, the recipient contact identifier identifies a Mobile Station International Subscriber Directory Number (MSISDN).

Preferably, the personalised MMS message having a redeemable component comprises a digital gift card, voucher, coupon, or advertisement.

Preferably, the redeemable component of the personalised MMS message comprises a unique code, such as a barcode or a quick response code, which is scannable from the recipient mobile computing device to pay for one or more products and/or services.

Preferably, no authentication of the recipient mobile computing device is required to redeem the personalised MMS message.

Preferably, no authentication of the recipient is required to redeem the personalised MMS message.

Preferably, the personalised MMS message comprises a picture or video and/or audio that is personalised for the recipient.

Preferably, a personalised component of the personalised MMS message comprises the recipient's name.

Suitably, the personalised MMS message having a redeemable component is immediately redeemable by clicking on a Uniform Resource Locator (URL) link displayed on the MMS message.

Preferably, the personalised MMS message includes animated graphics such as an animated GIF file and can include sound.

Suitably, the recipient contact identifier comprises the recipient MSISDN.

Suitably, the recipient contact identifier identifies a contact for which the MSISDN is stored on the server.

Suitably, performing the security verification comprises:
 determining a fraud risk profile score for each of the MSISDN or one or more of the details of the sender.

Suitably, the method comprises:
 comparing the fraud risk profile score to a fraud risk threshold to determine whether the security verification is successful.

Suitably, determining the fraud risk profile score comprises:
 comparing the MSISDN with one or more records of MSISDNs used in relation to fraud or associated with poor credit ratings.

Suitably, the one or more details of the sender comprise one or more of the following: a sender MSISDN; a sender email address; and sender payment details.

Suitably, determining the fraud risk profile score comprises one or more of the following:
 comparing the sender MSISDN with one or more records of MSISDNs used in relation to fraud or associated with poor credit ratings;
 comparing the sender email address with one or more records of email addresses used in relation to fraud and/or associated with poor credit ratings;
 comparing an internet protocol (IP) address of the first computing device with a source IP address of packets received at the server from the first computing device;
 comparing the sender payment details with one or more records of payment details used in relation to fraud or associated with poor credit ratings; and
 transmitting a request to a financial institution system to check whether the payment details are valid.

Suitably, the method comprises receiving, at the server, a date or time at which to transmit the personalised MMS message to the recipient mobile computing device.

Suitably, the method comprises scheduling the generation and transmission of the personalised MMS message for the date or time.

Suitably, the personalised MMS message is transmitted to the recipient mobile computing device via an MMS gateway.

Preferably, the personalised MMS message is immediately redeemable using a physical scanner.

In another form, although not necessarily the broadest form, the invention resides in computer readable medium storing computer readable code components that when selectively executed by a processor cause the following:
 receiving, at a server from a first computing device, a selection of an MMS message product;
 receiving, at the server from the first computing device, a recipient contact identifier identifying a recipient mobile number;
 performing, via the server, a security verification of a recipient or sender based on the recipient mobile number or one or more details of the sender received from the first computing device;
 where the security verification is successful, generating, via the server, based on the selection of the MMS message product, a personalised MMS message having a redeemable component and a personalised image uniquely rendered for the recipient; and
 transmitting, the personalised MMS message to a recipient mobile computing device via a multimedia message service (MMS) using the recipient mobile number;
 whereby the personalised MMS message is scannable or otherwise immediately redeemable from the recipient mobile computing device to pay for one or more products and/or services.

Preferably, the personalised MMS message can be tracked as it is a registered service.

Embodiments of the present invention thus enable the instant delivery of individual and personalised, trackable, rich media messages direct to any mobile user. The technology process disclosed herein is a catalyst for a major transformation in business to people (B2P) communications. The process can have immediate and broad ranging impact in the advertising and promotions industries as well as in the transmission and redemption of digital financial value products such as coupons, vouchers and gifts.

Preferably, the transmission to the recipient is personalised and uniquely codes a rich multimedia message (MMS) that arrives direct and complete in a user's TXT inbox, which inbox has superior access to users than other current communications platforms.

Further forms and features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The present drawings and description are generally focused on the embodiment of the present invention in the form of digital gift cards; however, those skilled in the art will appreciate that the teachings herein are also applicable to other embodiments such as digital vouchers, coupons, advertisements or messages. The drawings are provided by way of example only, wherein.

Figure 1:
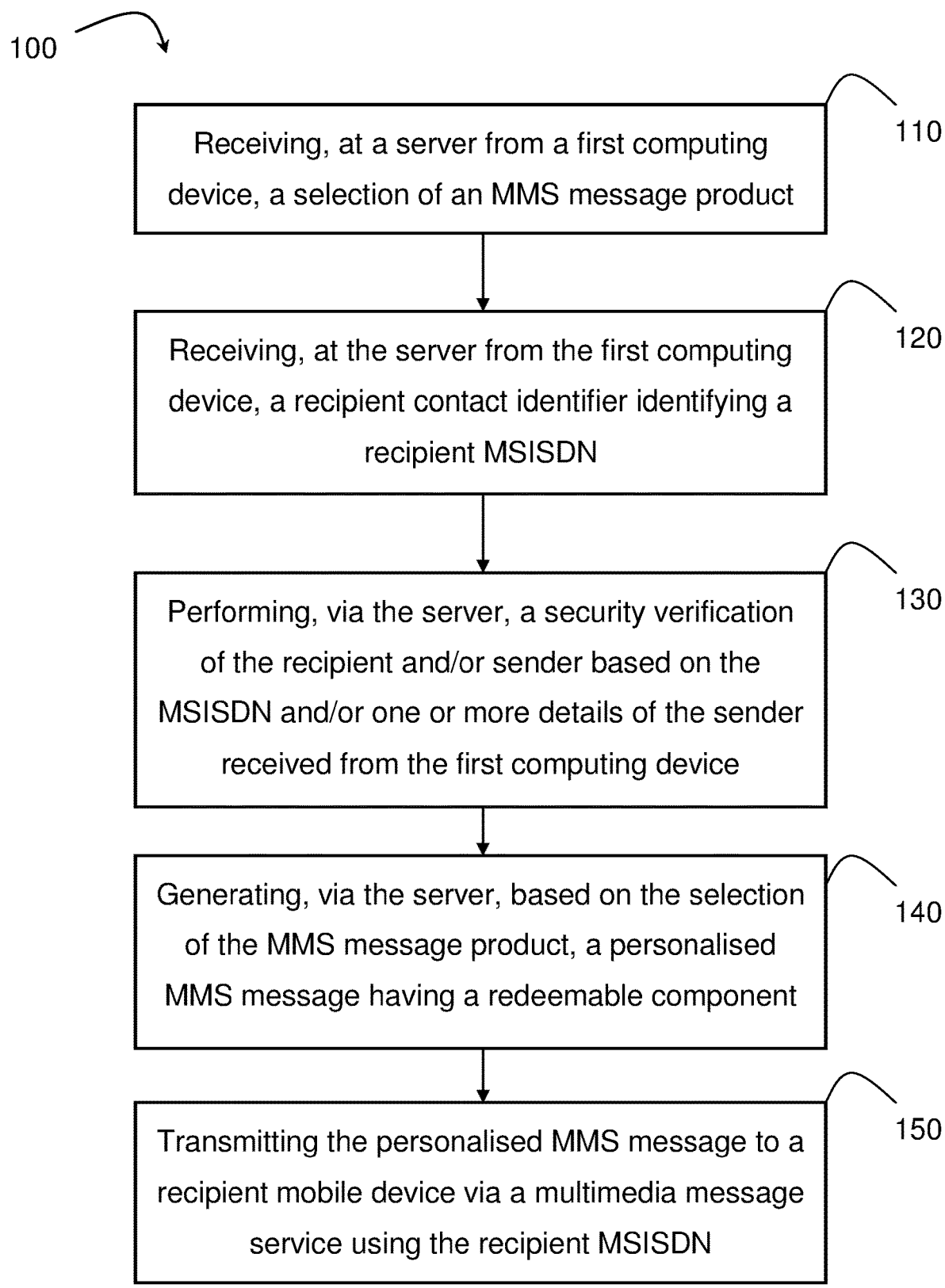
FIG. 1 illustrates a method for generating a personalised MMS message having a redeemable component according to one embodiment of the invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

The present invention relates to systems and methods for personalised MMS message having a redeemable component. In particular, the present invention relates to generating a digital gift card, voucher, coupon, advertisement or message that can be scanned or that is otherwise immediately redeemable from a mobile computing device.

FIG. 1 illustrates a method 100 for generating a personalised Multimedia Message Service (MMS) message having a redeemable component and a personalised image uniquely rendered for the recipient, according to one embodiment of the invention. The method 100 comprises the following steps:

At step 110, the method 100 comprises receiving, at a server from a first computing device, a selection of an MMS message product. The selection of the MMS message product can include, for example, a selection of a business or businesses for which the personalised MMS message is to be used and/or a selection of a monetary value for the redeemable component of the personalised MMS message. In some embodiments, the server also receives a message for the recipient of the personalised MMS message from the first computing device.

At step 120, the method 100 comprises receiving, at the server from the first computing device, a recipient contact identifier identifying a recipient mobile number such as a Mobile Station International Subscriber Directory Number (MSISDN). For example, the recipient contact identifier comprises the recipient MSISDN or identifies a contact for which the MSISDN is stored on the server.

At step 130, the method 100 comprises performing, via the server, a security verification of the recipient or sender based on the MSISDN or one or more details of the sender received from the first computing device.

If the security verification is successful, at step 140, the method 100 comprises generating, via the server, based on the selection of the MMS message product, a personalised MMS message having a redeemable component and a personalised image uniquely rendered for the recipient.

At step 150, the method 100 comprises transmitting the personalised MMS message to a recipient mobile computing device via a multimedia message service (MMS) using the recipient MSISDN.

The personalised MMS message is then active and scannable from the recipient mobile computing device to pay for one or more products and/or services, for example, via a laser scanner at a point of sale.

Figure 2:
FIG. 2 illustrates a digital gift card according to one embodiment of the invention.

FIG. 2 illustrates a digital gift card 200 according to one embodiment of the invention. The digital gift card 200 comprises a unique code 210, such as a barcode or a quick response code, which is scannable from the recipient mobile computing device to pay for one or more products and/or services. For example, the barcode can be a pdf417 barcode such that it is readable via laser scanners regularly found in retail stores.

The digital gift card 200 also includes a monetary value 220 of the digital gift card 200, a validity date 230 until which the digital gift card 200 is valid, a business identifier 240 identifying a business or organisation with which the digital gift card 200 is associated, a reference number 250, a pin number 270 and a message 260 for the recipient of the digital gift card 200.

Advantages of the present invention thus include enabling a transaction experience involving a personalised MMS message having a redeemable component and a personalised image uniquely rendered for the recipient to include more of the excitement, timing, spontaneity and warmth of an "in person" transaction. For example, digital gift cards according to some embodiments can be redeemed immediately when opened, and without the need for the gift card recipient to execute tedious registration or authentication processes. Further, according to some embodiments, because MMS messages are generally monitored by mobile device users much more closely than email, a digital gift card can be timed to be sent and received by a recipient at an exact predetermined moment when the sender believes the excitement of receiving the card will be greatest.

According to various embodiments of the present invention, personalised MMS messages having a redeemable component as described herein include various types of electronic gift cards, coupons, advertisements and vouchers used for various occasions, including business promotions and personal gifts.

Embodiments of the present invention also provide a personalised MMS message having a redeemable component and a personalised image uniquely rendered for the recipient that is sent to a mobile computing device while mitigating security and fraud risks. In particular, embodiments of the present invention provide a fraud and/or security checked message via MMS. The redeemable component of the personalised MMS message can be scanned directly from the message and therefore does not require the recipient to follow URL links that could put the recipient's computing device at risk of viruses, for example, by opening URL links from fraudulent messages or emails.

Further, each MMS message is not only personalised but uniquely trackable based on: a) the code presented; b) the number the MMS message is sent to; and/or c) unique attributes of the uniquely rendered personalised image such as a digital "fingerprint" of the image. Thus, there can be complete trace ability from initial purchase to delivery; if a card is lost/stolen then it can be replaced easily, and reminders and follow-ups can be sent to ensure effective delivery and usage.

Further, embodiments of the present invention also enable a sender and/or receiver to be checked in relation to fraud a non-intrusive manner based on the existence of social media profiles and network scrapes relating to the sender and/or receivers details.

Figure 3:
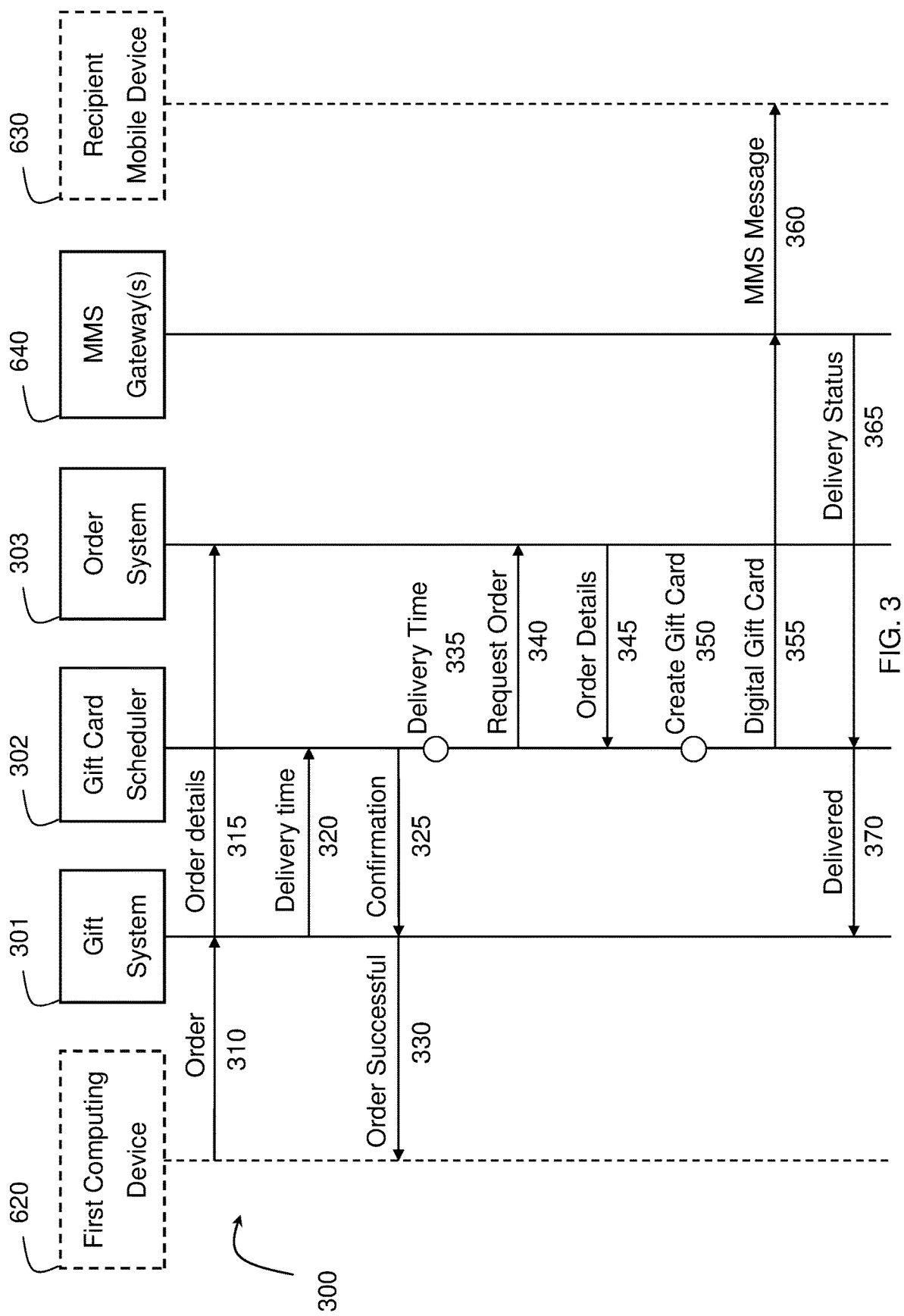
FIG. 3 illustrates a schematic showing a method performed in an order processing system according to one embodiment of the invention.

FIG. 3 illustrates a schematic showing a method 300 performed in an order processing system for ordering a digital gift card according to one embodiment of the invention.

The order processing system includes a gift system 301, a gift card scheduler 302 and an order system 303. The gift system 301 transmits and receives data from one or more first computing devices 620, for example in relation to orders for gift card products. The gift card scheduler 302 manages timing for the delivery of gift cards to recipients such that a sender of a gift card can choose for the gift card to be received by a recipient at a specific time. The order system 303 stores details for orders of gift card products which are used to generate a digital gift card for delivery to a recipient.

At step 310, an order is received by the gift system 301 from a first computing device 620. For example, the order can be received via a selection of a gift card product, one or more parameters for the gift card, such as the monetary value and/or the message for the recipient. The order can also include a date and/or time at which to transmit a digital gift card to a recipient mobile computing device. At step 315, order details of the order are transmitted from the gift system 301 to the order system 303, and at step 320, a delivery date and/or time for the order is transmitted from the gift system 301 to the gift card scheduler 302. The gift card scheduler 302 schedules the generation and transmission of the digital gift card for the date and/or time.

The gift system 301 receives a confirmation from the gift card scheduler 302 that the delivery is scheduled at step 325, and transmits a notification to the first computing device 620 that the order was successful at step 330. The gift card scheduler 302 waits for the delivery date and/or time as represented by step 335. When the delivery time arrives, the gift card scheduler 302 transmits a request for the order details to the order system 303 at step 340. At step 345, the gift card scheduler 302 receives the order details from the order system 303 and, at step 350, the order system 303 generates a digital gift card.

A unique code is allocated for the digital gift card. For example, the unique code can be allocated via a system of a retailer, or from a list of unique codes received from a retailer and associated with specific products. In some embodiments, the unique code is generated via an algorithm on the server and transmitted to a system of the retailer, for example, with associated details of the gift card product, such that the unique code can be recognised by scanners at the retailer.

The gift card scheduler 302 transmits the generated digital gift card to a MMS gateway 640 at step 355 and, at step 360, the MMS gateway 640 transmits a MMS message comprising the digital gift card to a recipient mobile computing device 630. At step 365, the MMS gateway 640 transmits a delivery status to the gift card scheduler 302. After the MMS message is delivered, at step 370 the gift card scheduler 302 transmits a delivery notification to the gift system 301.

Figure 4:
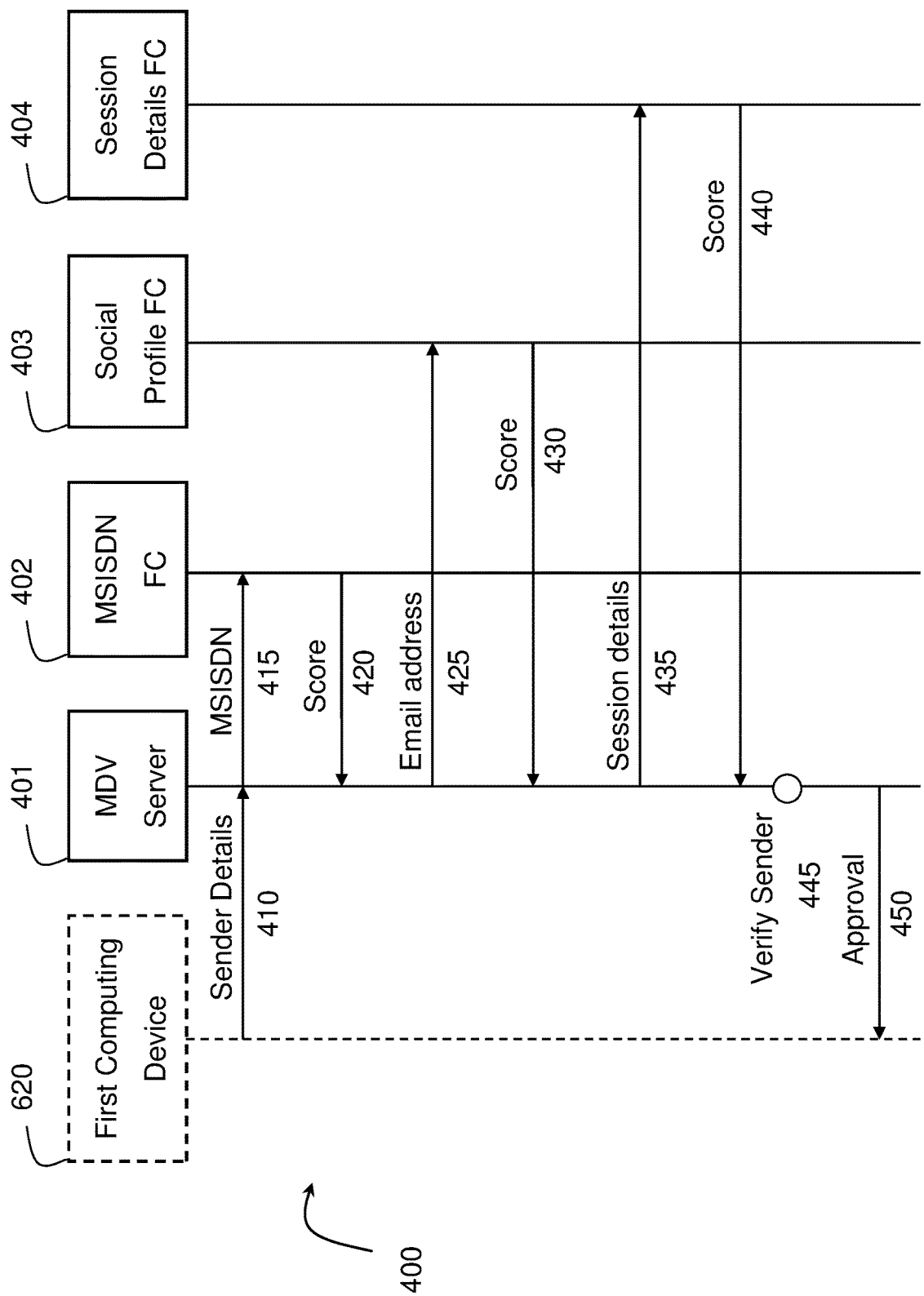
FIG. 4 illustrates a schematic of a security verification method according to one embodiment of the invention.

FIG. 4 illustrates a schematic of a security verification method 400 performed by a security check system according to one embodiment of the invention. For example, the method 400 is performed to verify whether a sender is trustworthy when the sender registers with, or logs onto, the gift system.

The security check system comprises a multidimensional verification (MDV) server 401, a MSISDN fact checker 402, a social profile fact checker 403 and a session details fact checker 404. The MDV server 401 performs a security verification of the sender based on one or more details of the sender received from the first computing device 620. The MSISDN fact checker 402 uses a MSISDN or mobile phone number scrape reporter to determine security or fraud risks in relation to MSISDNs. The social profile fact checker 403 uses network scrapes of social media profiles associated with email addresses to determine security or fraud risks in relation to email addresses. The session details fact checker 404 compares device and session details received from the first computing device with packet data received from the first computing device to determine whether the user of the first computing device is hiding or spoofing their location and/or identity.

At step 410, the MDV server 401 receives one or more details of the sender from the first computing device 620. For example, the one or more details of the sender comprise a sender MSISDN, a sender email address, sender payment details, sender session details and/or details of the first computing device. At step 415, the sender MSISDN is transmitted from the MDV server 401 to the MSISDN fact checker 402. The MSISDN fact checker 402 compares the sender MSISDN with one or more records of MSISDNs used in relation to fraud and/or associated with poor credit ratings. At step 420, a fraud risk profile score is received at the MDV server 401 from the MSISDN fact checker 402. The fraud risk profile score is based on the comparison performed by the MSISDN fact checker 402.

At step 425, the sender email address is transmitted from the MDV server 401 to the social profile fact checker 403.

The social profile fact checker 403 compares the sender email address with one or more records of email addresses used in relation to fraud and/or associated with poor credit ratings, for example, on social media. At step 430, a fraud risk profile score is received at the MDV server 401 from the social profile fact checker 403. The fraud risk profile score is based on the comparison performed by the social profile fact checker 403.

At step 435, sender session details and/or details of the first computing device are transmitted from the MDV server 401 to the session details fact checker 404. The session details fact checker 404 compares the sender session details and/or details of the first computing device received from the first computing device with the session details and details of the first computer as determined at the server 401. For example, the session details fact checker 404 compares an internet protocol (IP) address of the first computing device 620 with a source IP address of packets received at the server 401 from the first computing device 620. This enables the session details fact checker 404 to determine whether the sender is concealing their IP address from the server 401 via a proxy or another method. At step 440, a fraud risk profile score is received at the MDV server 401 from the session details fact checker 404. The fraud risk profile score is based on the comparison performed by the session details fact checker 404.

At step 445, the fraud risk profile scores are compared to a fraud risk threshold to determine whether the security verification is successful. If the security verification is successful, an approval of the sender details is transmitted from the MDV server 401 to the first computing device 620. The server can also send a short message service (SMS) message including a code to a mobile computing device associated with the sender to provide a two-step verification. If the security verification fails, the sender is flagged for a follow up.

Figure 5:
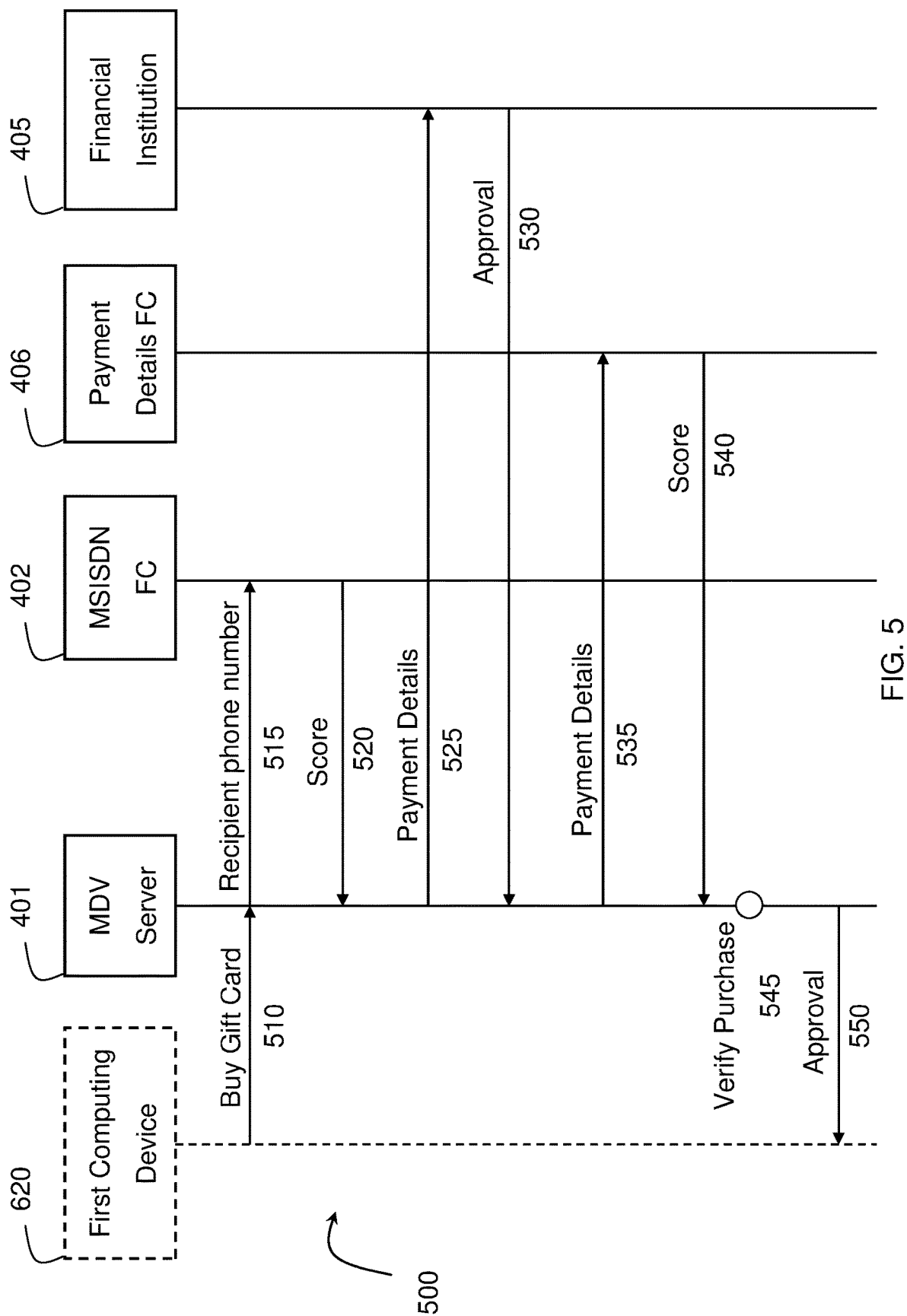
FIG. 5 illustrates a schematic of another security verification method according to one embodiment of the invention.

FIG. 5 illustrates a schematic of a security verification method 500 performed by a security check system according to one embodiment of the invention. For example, the security verification method 500 is performed to verify a purchase of a gift card for a recipient via the present gift system.

The security check system comprises the MDV server 401, the MSISDN fact checker 402 and a payment details fact checker 406. The payment details fact checker 403 checks records of payment methods used in relation to fraud or associated with poor credit records to determine a security or fraud risk in relation to the payment details. This provides an additional level of security in relation to the payment beyond methods such as a bank identification number (BIN) and card verification value (CVV) lookup which are typically performed during a card payment or a PayPal log in used for a PayPal payment.

At step 510, the multidimensional verification (MDV) server 401 receives a request from the first computing device 620 to purchase a gift card product. For example, the request can include an MSISDN of a recipient of the digital gift card and payment details for the gift card product. At step 515, the MSISDN is transmitted from the MDV server 401 to the MSISDN fact checker 402. The MSISDN fact checker 402 compares the MSISDN with one or more records of MSISDNs used in relation to fraud and/or associated with poor credit ratings. At step 520, a fraud risk profile score is received at the MDV server 401 from the MSISDN fact checker 402.

At step 525, the payment details, such as a BIN number and CVV associated with a payment method, are transmitted from the MDV server 401 to a financial institution server 405, for example, to pay for a gift card product. The financial institution server 405 checks whether the payment details are valid. At step 530, an approval of the payment details is received at the MDV server 401 from the financial institution server 405.

At step 535, the payment details are transmitted from the MDV server 401 to a payment details fact checker 406. The payment details fact checker 406 compares the payment details with one or more records of payment details used in relation to fraud and/or associated with poor credit ratings. At step 540, a fraud risk profile score is received at the MDV server 401 from the payment details fact checker 406. The fraud risk profile score is based on the comparison performed by the payment details fact checker 405.

At step 545, the fraud risk profile scores are compared to a fraud risk threshold to determine whether the security verification is successful. The security verification is also based on the approval of the payment details. If the security verification is successful, an approval of the purchase is transmitted from the MDV server 401 to the first computing device 620. If the security verification fails, the sender and/or receiver is flagged for a follow up.

When the MDV process is operational the company builds a unique array of attributes that relate peculiarly to each unique transaction—this array is so complex that within the industry it is often referred to as a digital finger print—in that it is so unique it is a one off, and cannot be fraudulently generated. If the fingerprint attributes show up flags for fraud or manual review the order is cancelled and an image is not generated and is not sent.

Figure 6:
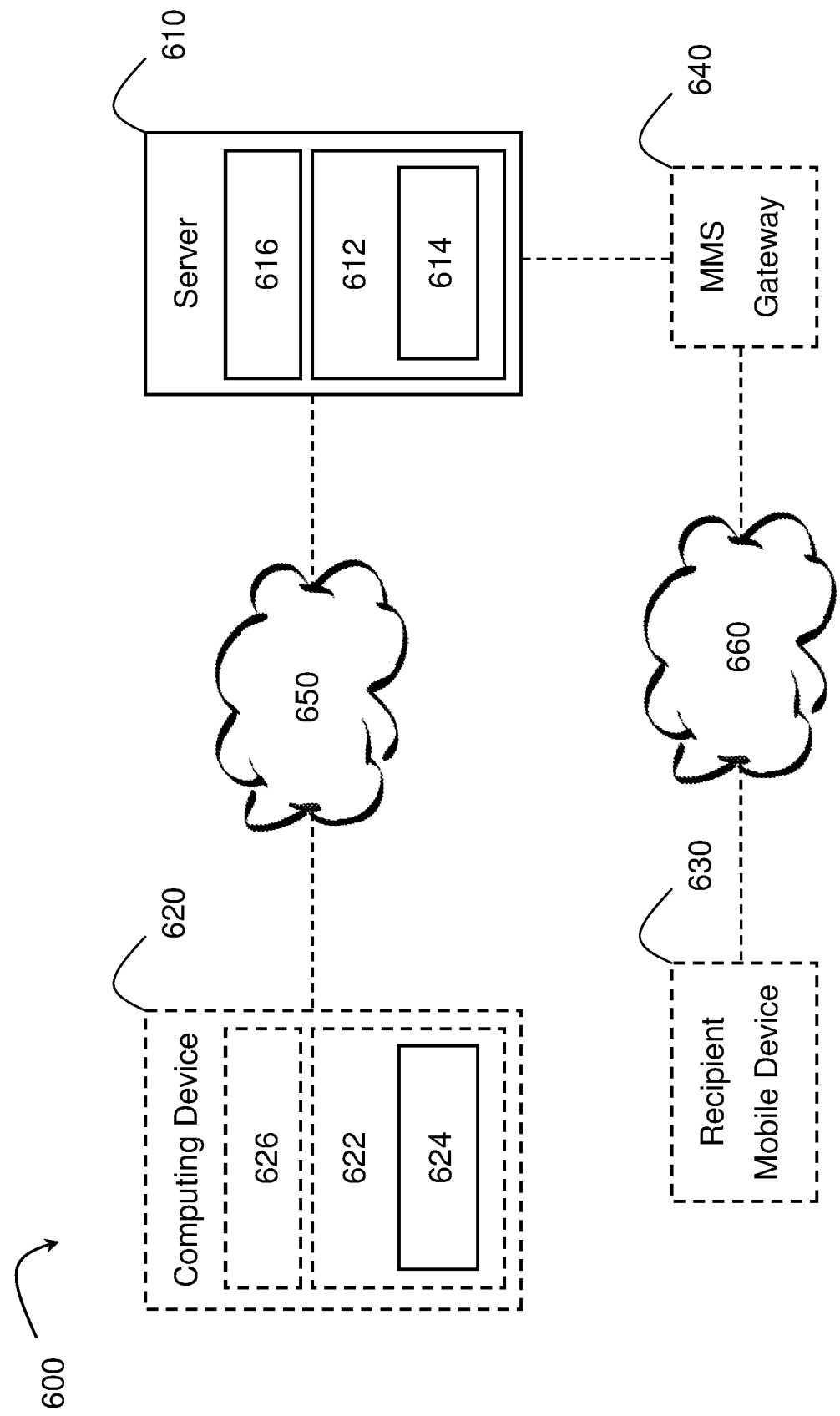
FIG. 6 illustrates a system according to one embodiment of the invention.

FIG. 6 illustrates a system 600 according to one embodiment of the invention. For example, the method 100, the method 300, the security verification method 400 and/or the security verification method 500 are implemented in the system 600.

The system 600 comprises a server 610 that is in communication with a first computing device 620 via a communications network 650. The server 610 comprises a computer memory 612 which can be, for example, a computer readable medium. The computer memory 612 stores computer readable code components 614 that when selectively executed by a processor 616 implement one or more aspects of the present invention, such as, the method 100, the method 300, the security verification method 400 and the security verification method 500.

As will be understood by someone having ordinary skill in the art, the server 610 can incorporate various elements used in executing the methods, 100, 300, 400, 500, including, for example, the gift system 301, gift card scheduler 302, order system 303, MDV server 401, MSISDN fact checker 402, social profile fact checker 403 and session details fact checker 404, and payment details fact checker 406.

The first computing device 620 can also store computer readable code components 624 for communicating with the server 610. The first computing device 620 can comprises a memory 622, such as a computer readable medium upon which the computer readable code components 624 are stored. The computer readable code components 624 can be selectively executed by a processor 626 of the first computing device 620 to implement one or more aspects of the present invention.

The server 610 is also in communication with an MMS gateway 640. MMS messages, for example, comprising a digital gift card, can be sent from the MMS gateway via a communications network 660 to a recipient mobile computing device 630.

FIGS. 7-18 and 21-29 illustrate an app for receiving orders for a digital gift card. In some embodiments, the app is stored on the computer readable medium of the first computing device 620 and executed via the processor of the first computing device. In some embodiments, the app is downloadable to the first computing device 620 from an app store and/or the server 610.

Figure 7:
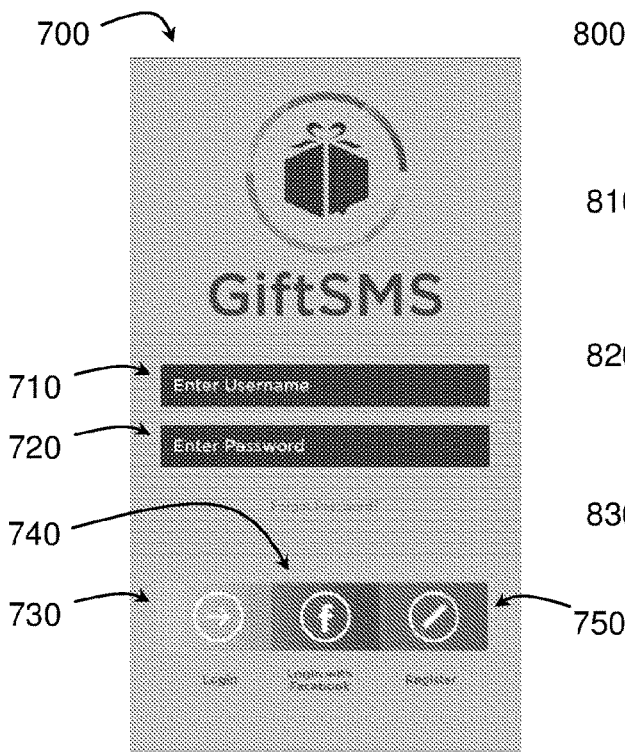
FIG. 7 illustrates a login screen of an app according to one embodiment of the invention.

FIG. 7 illustrates a login screen 700 of the app according to one embodiment of the invention. The login screen 700 comprises a username field 710 to receive a username, a password field 720 to receive a password and a login button 730 to log in using the username and password. The login screen 700 also comprises a Facebook login button 740 to log in using a Facebook identity and a register button 750 to register as a new user.

Figure 8:
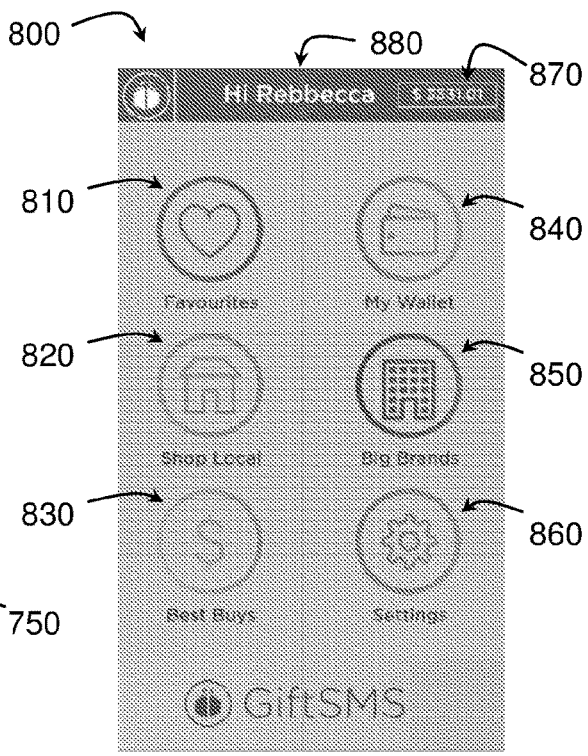
FIG. 8 illustrates a menu screen of the app according to one embodiment of the invention.

FIG. 8 illustrates a menu screen 800 of the app according to one embodiment of the invention. For example, the menu screen 800 opens when the user logs in. The menu screen 800 comprises selectable indicia for opening aspects of the app. The selectable indicia include a "favourites" indicia 810, a "shop local" indicia 820, a "best buys" indicia 830, a "my wallet" indicia 840, a "big brands" indicia 850 and a "settings" indicia 860. The menu screen 800 also comprises a wallet value 870 showing funds that the user has available to spend, and a welcome message 870 including a name of the user. After log in, the wallet can be locked to prevent purchases while the MDV server 401 performs the security verification method 400. In some embodiments, when a two-step verification is used, the wallet remains locked until the sender enters the code provided via the SMS message.

Figure 9:
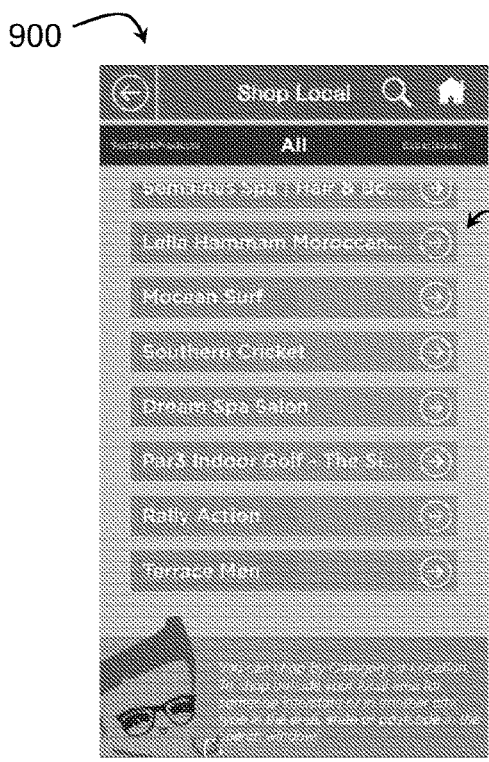
FIG. 9 illustrates a shop local screen of the app according to one embodiment of the invention.

FIG. 9 illustrates a shop local screen 900 of the app according to one embodiment of the invention. For example, the shop local screen 900 opens when the "shop local" indicia 820 is selected. The shop local screen 900 comprises selectable business indicia 910. The selectable business indicia 910 can be selected to select a gift card product.

Figure 10:
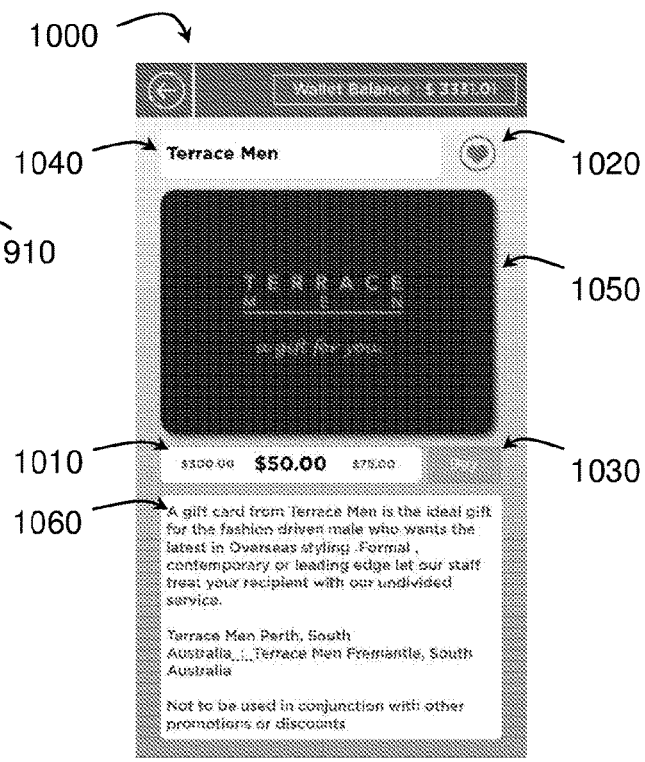
FIG. 10 illustrates a gift card product screen of the app according to one embodiment of the invention.

FIG. 10 illustrates a gift card product screen 1000 of the app according to one embodiment of the invention. For example, the gift card product screen 1000 opens when a business indicium 910 is selected. The gift card product screen 1000 includes details of the gift card product, such as, the business name 1040, the business logo 1050 and details 1060 regarding the gift card and/or the business. For example, details 1060 can include promotion details and/or disclaimers regarding the business or gift card.

The gift card product screen 1000 comprises selectable value indicia 1010. The selectable value indicia 1010 can be selected to select a value for the gift card, such as $300, $50 or $75. A favourites button 1020 is selectable to store the selected gift card product as a favourite. A user can proceed to purchase the gift card product by selecting a "buy" button 1030.

Figure 11:
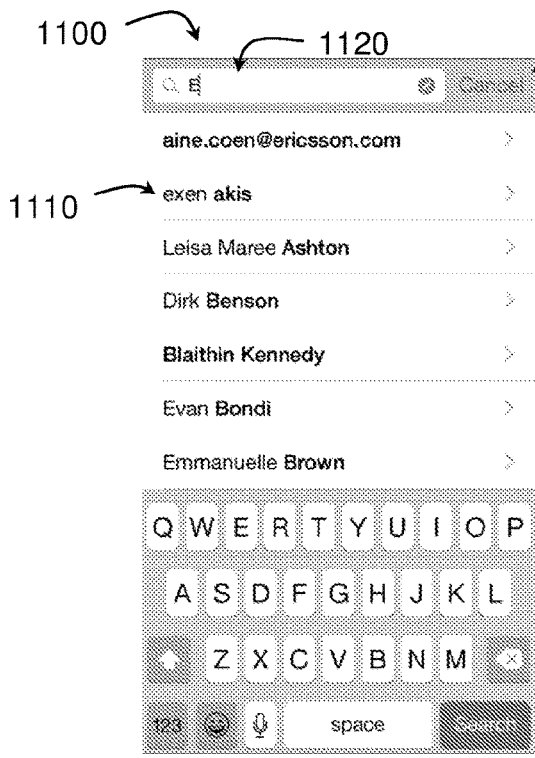
FIG. 11 illustrates a recipient selection screen of the app according to one embodiment of the invention.

FIG. 11 illustrates a recipient selection screen 1100 of the app according to one embodiment of the invention. For example, the recipient selection screen 1100 opens when the "buy" button 1030 is selected. The recipient selection screen 1100 comprises selectable recipient indicia 1110. The selectable recipient indicia 1110 can be selected to select a recipient for the gift card, for example, from a list of contacts on the first computing device 620. A search field 1120 is provided to search for a recipient and a "cancel" button is provided to cancel the purchase.

Figure 12:
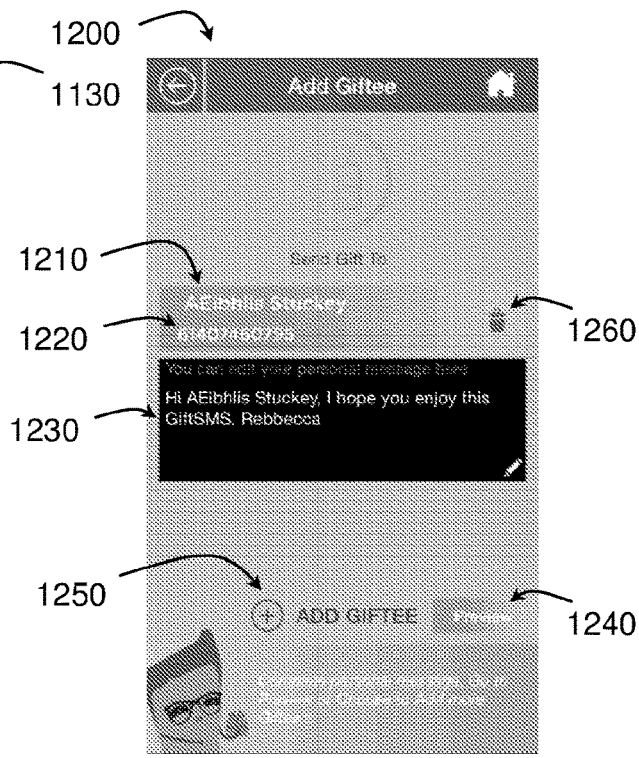
FIG. 12 illustrates a recipient details screen of the app according to one embodiment of the invention.

FIG. 12 illustrates a recipient details screen 1200 of the app according to one embodiment of the invention. For example, the recipient details screen 1200 opens when a recipient indicium 1110 is selected. The recipient details screen 1200 comprises details of the recipient, such as, a name 1210 and a mobile telephone number or MSISDN 1220 of the recipient. An editable text field 1230 is provided to enable the sender to compose a message for the recipient. A "preview" button 1240 is selectable to preview the gift card. An "add giftee" button 1250 is selectable to select more recipients and a delete button 1260 is selectable to remove a selected recipient.

Figure 13:
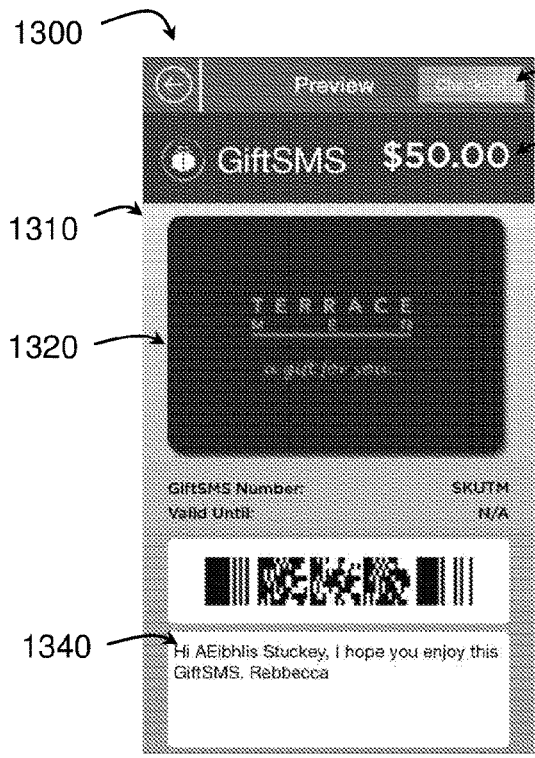
FIG. 13 illustrates a gift card preview screen of the app according to one embodiment of the invention.

FIG. 13 illustrates a gift card preview screen 1300 of the app according to one embodiment of the invention. The gift card preview screen 1300 shows a preview 1310 of the gift card including the business 1320 with which the gift card is associated, the monetary value 1330 of the gift card and the message 1340 for the recipient of the gift card. A "checkout" button 1350 is provided to proceed to a checkout screen and pay for the gift card product.

Figure 14:
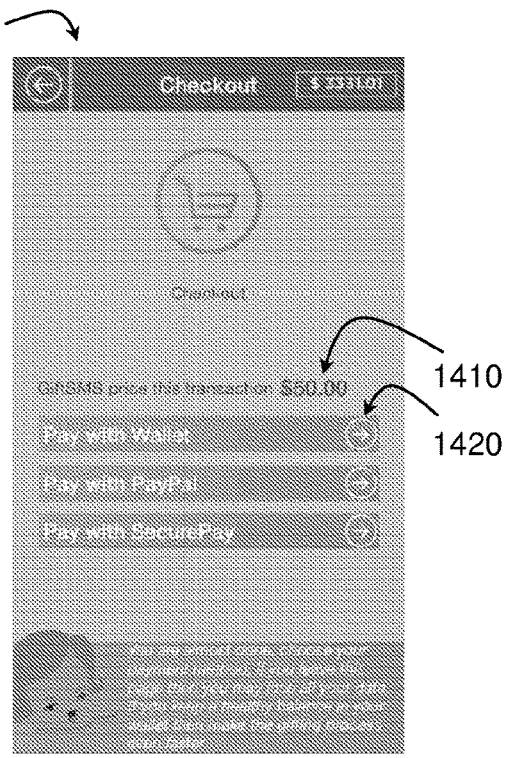
FIG. 14 illustrates a checkout screen of the app according to one embodiment of the invention.

FIG. 14 illustrates a checkout screen 1400 of the app according to one embodiment of the invention. The checkout screen 1400 shows the price 1410 of the purchase and one or more selectable payment indicia 1420. The one or more selectable payment indicia 1420 select a payment method for paying for the gift card product. In preferred embodiments, the MDV server 401 performs the security verification method 500 in relation to the selected payment method and recipient. For example, the security verification method 500 can be performed by a background process in parts as each recipient and payment method is selected.

Figure 15:
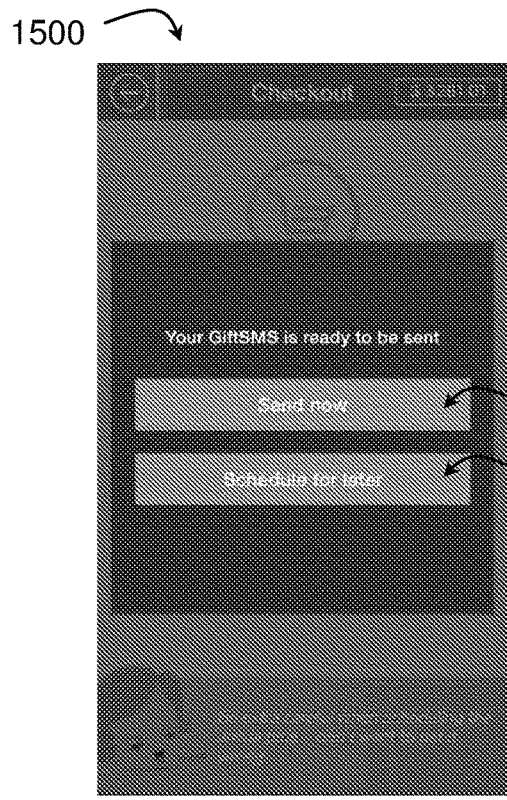
FIG. 15 illustrates a scheduler screen of the app according to one embodiment of the invention.

FIG. 15 illustrates a scheduler screen 1500 of the app according to one embodiment of the invention. The scheduler screen 1500 comprises selectable indicia to select a date and/or time for delivery of the digital gift card to the recipient. The selectable indicia include a "send now" indicium 1510 to deliver the digital gift card immediately and a "schedule for later" indicium 1520 to schedule the digital gift card to be sent at a later date and/or time.

Figure 16:
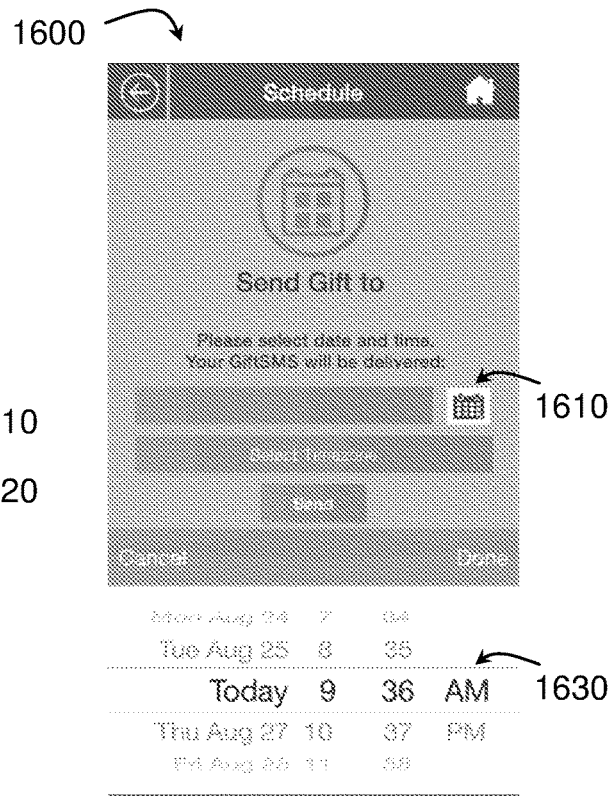
FIG. 16 illustrates selection of a date/time via a date/time selection screen of the app according to one embodiment of the invention.
Figure 17:
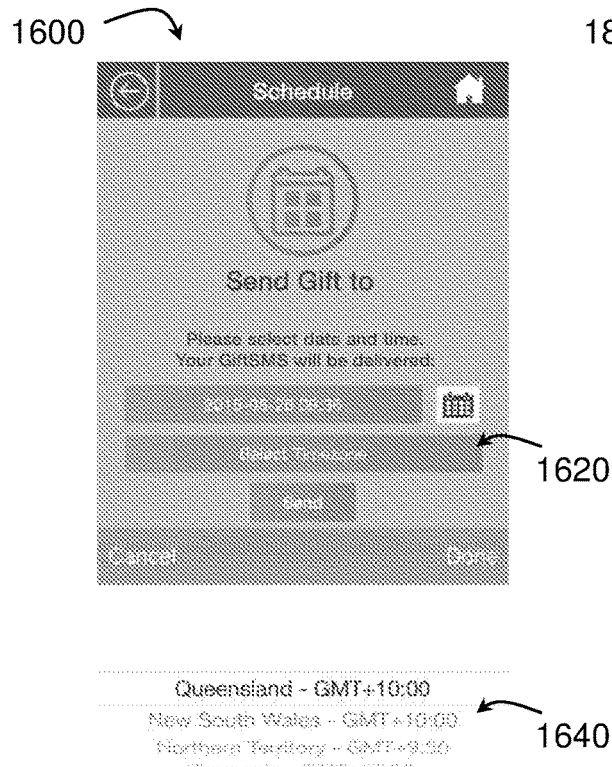
FIG. 17 illustrates selection of a time zone via a date/time selection screen of the app according to one embodiment of the invention.

FIGS. 16 and 17 illustrate a date/time selection screen 1600 of the app according to one embodiment of the invention. The date/time selection screen 1600 comprises a date/time selection field 1610 and a time zone selection field 1620. The date/time can be selected by selecting the date/time selection field 1610 and then selecting the date/time from a scrollable selection field 1630, as shown in FIG. 16. Similarly, the time zone can be selected by selecting the time zone selection field 1620 and then selecting the time zone from a scrollable selection field 1640, as shown in FIG. 17. A "send" button is selectable to schedule the delivery with the selected date/time and time zone.

If the security verifications are successful, the gift card product is purchased and a digital gift card is scheduled for delivery to the recipient mobile computing device at the selected date/time.

Figure 18:
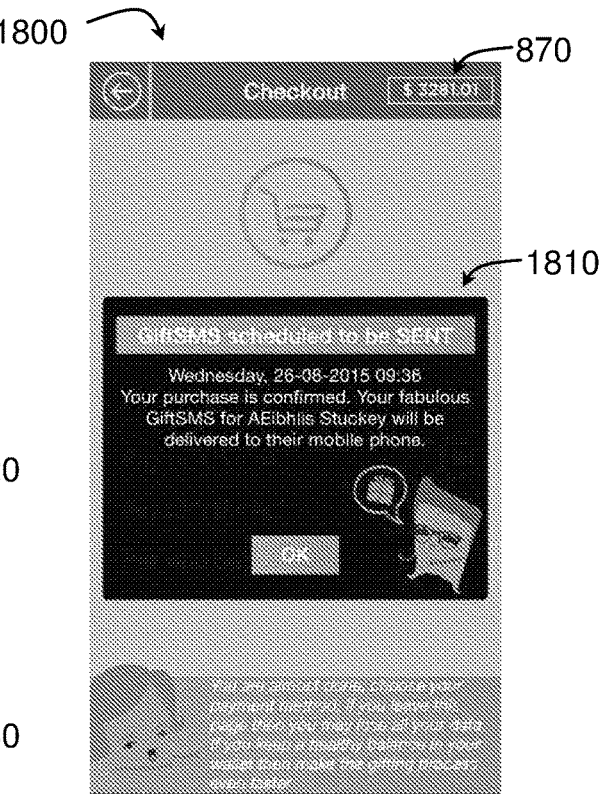
FIG. 18 illustrates a confirmation screen of the app according to one embodiment of the invention.

FIG. 18 illustrates a confirmation screen 1800 of the app according to one embodiment of the invention. The confirmation screen 1800 confirms that the gift card product has been purchased and that a digital gift card will be delivered to the recipient mobile computing device 630 at the selected date/time. The wallet value 870 on the confirmation screen 1800 has been debited by the price of the gift card product.

Figure 19:
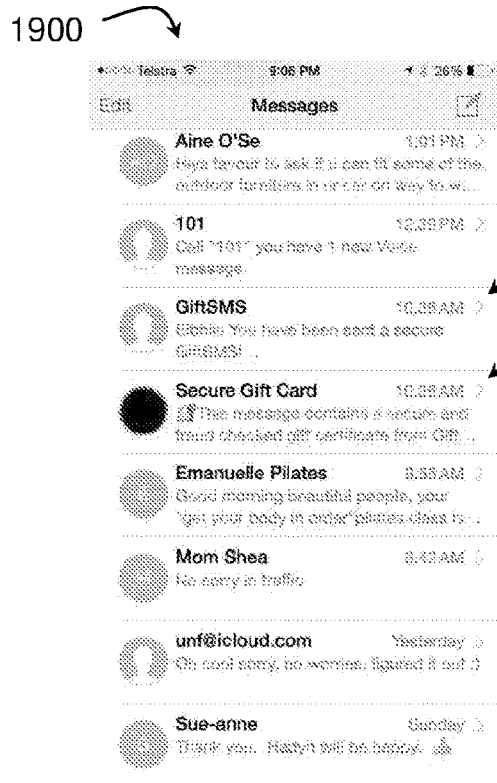
FIG. 19 illustrates a message app on the recipient mobile computing device according to one embodiment.

FIG. 19 illustrates a message app 1900 on the recipient mobile computing device 630 according to one embodiment. The message app shows a list of selectable message indicia including an MMS message indicium 1910 entitled "secure gift card" and a short message service (SMS) message indicia 1920 entitled "GiftSMS". The SMS message indicium 1920 is selectable to open an SMS message which notifies the recipient that they have been sent a secure digital gift card. The MMS message indicia 1910 opens an MMS message comprising the digital gift card.

Figure 20:
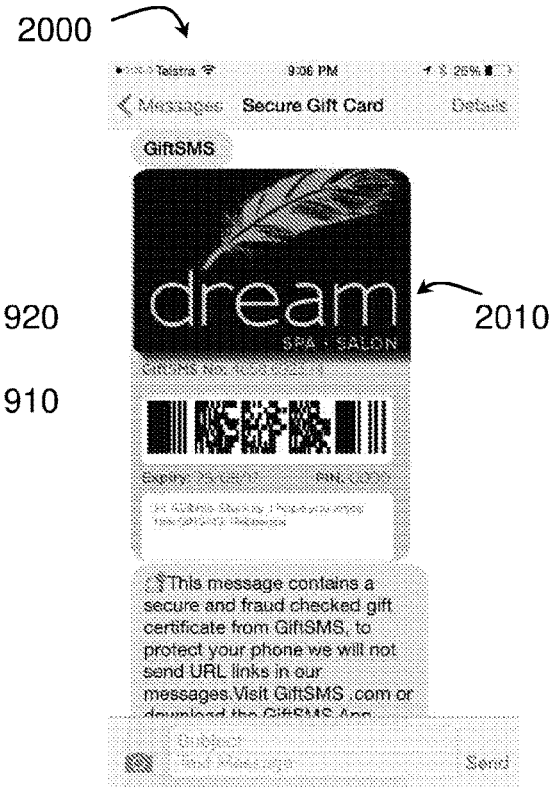
FIG. 20 illustrates an MMS message comprising a digital gift card according to one embodiment.

FIG. 20 illustrates an MMS message 2000 comprising a digital gift card 2010 according to one embodiment. For example, the MMS message 2000 can be viewed by selecting the MMS message indicia 1910 in the message app 1900. The MMS message 2000 notifies the recipient that the digital gift card 2010 has been security and fraud checked. For security, for example to defend against viruses, the MMS message 2000 contains no uniform resource locator (URL) links to external content. However, the digital gift card 2010 can be viewed in full by selecting the digital gift card 2010 in the MMS message 2000. The digital gift card 2010 is activated and ready for immediate use when it is received.

Embodiments of the present invention can also include animated graphics. For example, in the digital gift card 2010 the green feather above the word "dream" can be animated via an animated GIF (Graphics Interchange Format) file.

Figure 21:
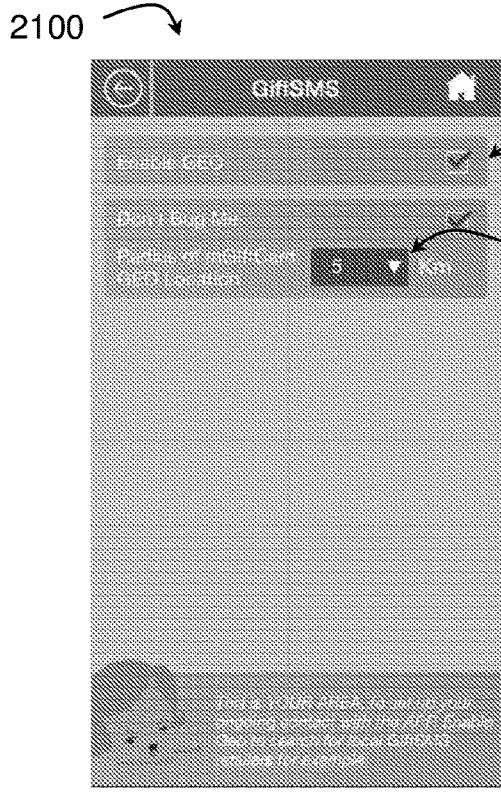
FIG. 21 illustrates a GEO location screen of the app according to one embodiment of the invention.

FIG. 21 illustrates a GEO location screen 2100 of the app according to one embodiment of the invention. The GEO location screen 2100 includes a selectable "enable" indicia 2110 to enable the use of location in the app and a radius selection menu 2120 to select a radius within which businesses will be shown on the app.

Figure 22:
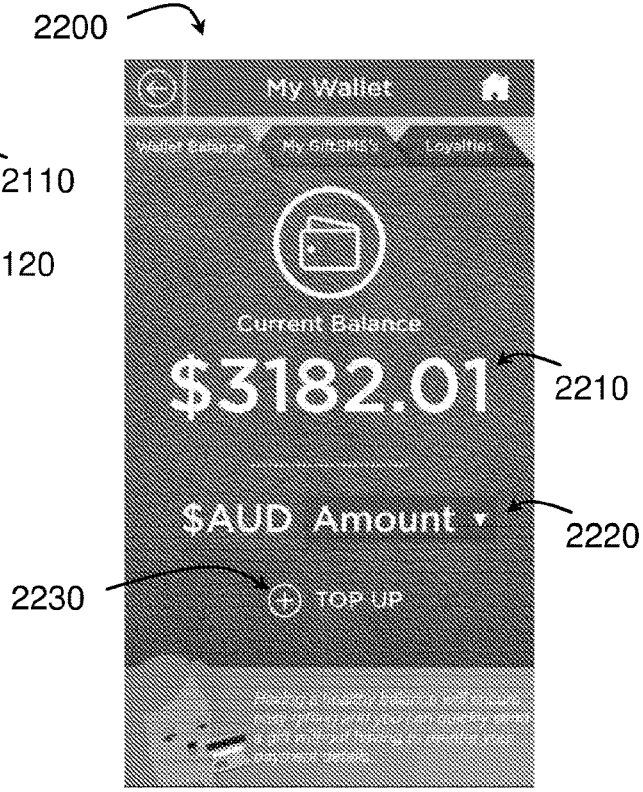
FIG. 22 illustrates a wallet screen of the app according to one embodiment of the invention.

FIG. 22 illustrates a wallet screen 2200 of the app according to one embodiment of the invention. The wallet screen 2200 shows the user's current funds. Additional funds can be added to the wallet by selecting an amount to add via an amount menu 2220 and selecting a top up indicia 2230.

Figure 23:
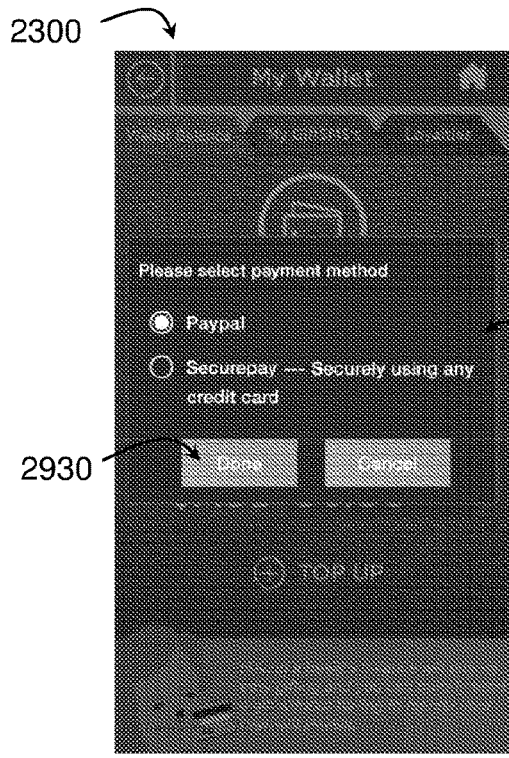
FIG. 23 illustrates a payment screen of the app according to one embodiment of the invention.

FIG. 23 illustrates a payment screen 2300 of the app according to one embodiment of the invention. For example, the payment screen 2300 is opened when the top up indicia 2230 is selected. The payment screen 2300 comprises payment method indicia 2310 to select a payment method and a "done" button to proceed with the payment.

Figure 24:
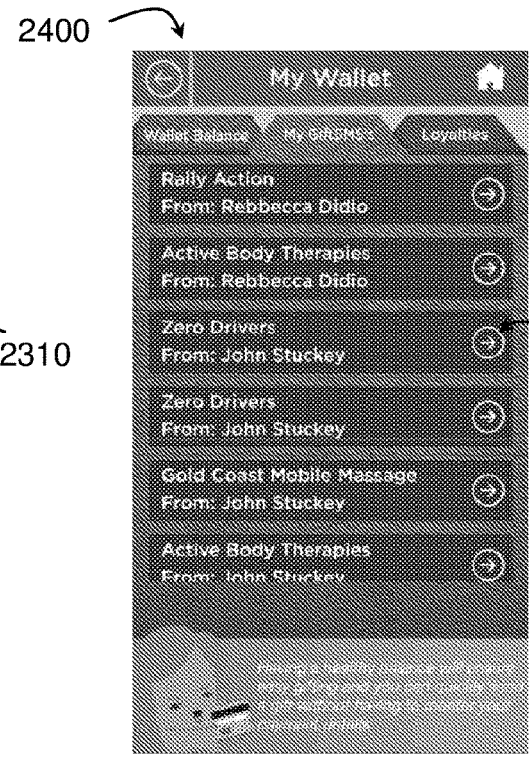
FIG. 24 illustrates a gift card screen of the app according to one embodiment of the invention.

FIG. 24 illustrates a gift card screen 2400 of the app according to one embodiment of the invention. The gift card screen 2400 comprises selectable indicia 2410 for opening digital gift cards that have been received by the user of the app. For example, the app can be linked to a message handler of the recipient mobile device 630 running the app to enable the app to automatically recognise and store digital gift card received by the recipient mobile device 630.

Figure 25:
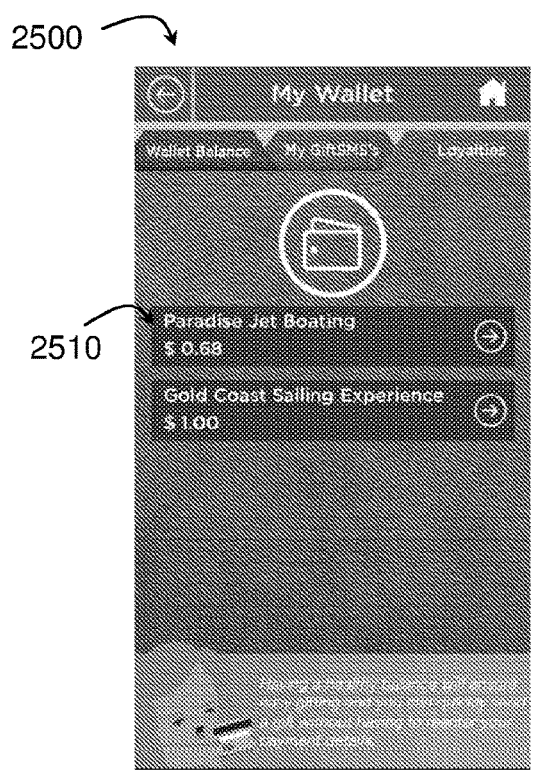
FIG. 25 illustrates a loyalties screen of the app according to one embodiment of the invention.

FIG. 25 illustrates a loyalties screen 2500 of the app according to one embodiment of the invention. The loyalties screen 2500 shows a loyalty bonus earned by purchasing gift cards for particular retailers of one or more digital gift cards stored on the recipient mobile device 630.

Figure 26:
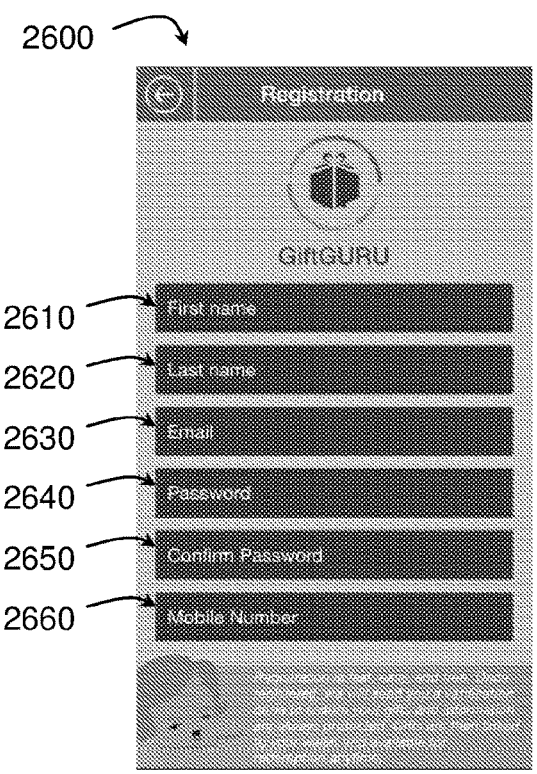
FIG. 26 illustrates a registration screen of the app according to one embodiment of the invention.

FIG. 26 illustrates a registration screen 2600 of the app according to one embodiment of the invention. The registration screen comprises editable text fields to receive details of a new user. The editable text fields include a "first name" field to receive a first name of the user, a "last name" field to receive a surname of the user, an "email" field to receive an email address of the user, an "password" field to receive a password of the user, a "confirm password" field to receive the password of the user again for confirmation and a "mobile number" field to receive an MSISDN or mobile telephone number of the user.

Figure 27:
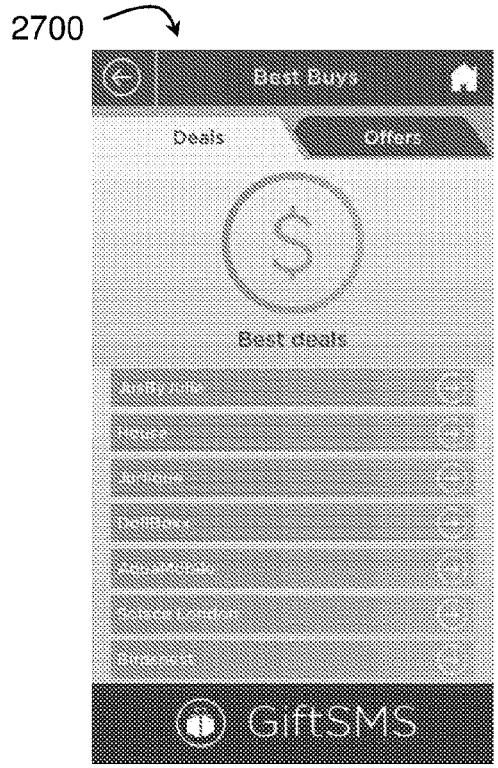
FIG. 27 illustrates a deals screen of the app according to one embodiment of the invention.

FIG. 27 illustrates a deals screen 2700 of the app according to one embodiment of the invention. The deals screen 2700 comprises selectable indicia 2710 for selecting deals from one or more businesses. The selectable indicia 2710 can direct the app to the website of the selected business or an associated advertiser, for example, to view more details of the selected deal.

Figure 28:
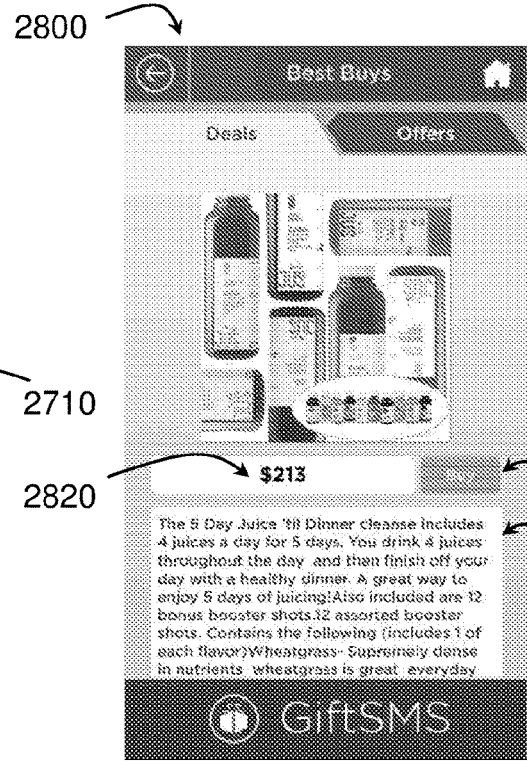
FIG. 28 illustrates a business deal screen of the app according to one embodiment of the invention.

FIG. 28 illustrates a business deal screen 2800 of the app according to one embodiment of the invention. The business deal screen 2800 shows the selected deal and includes details of the deal 2810, a price offered 2820 and a buy button 2830 to purchase the product for which the deal is offered. In some embodiments, a record of the businesses which the user has visited is recorded by the app and transmitted to the server.

Figure 29:
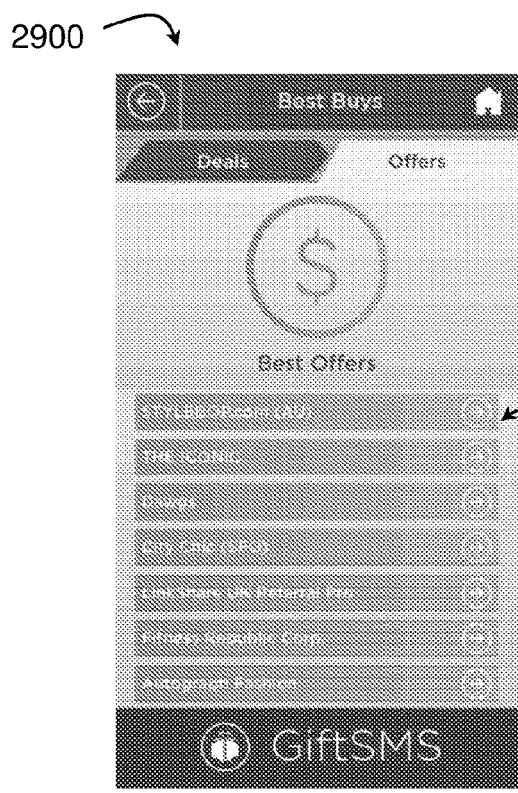
FIG. 29 illustrates a offers screen of the app according to one embodiment of the invention.

FIG. 29 illustrates an offers screen 2900 of the app according to one embodiment of the invention. The offers screen 2900 comprises selectable indicia 2910 for selecting one or more businesses to view offers of coupons from the selected business.

Figure 30:
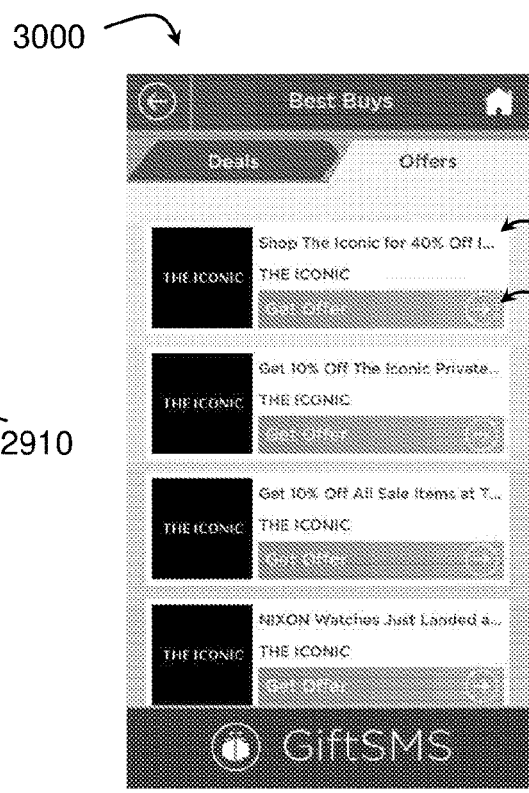
FIG. 30 illustrates a business offers screen of the app according to one embodiment of the invention.

FIG. 30 illustrates a business offers screen 3000 of the app according to one embodiment of the invention. The business offers screen 3000 shows offers and/or coupons for the selected business. Details 3010 of each offer or coupon are shown and selectable indicia 3020 can be selected to retrieve the offer or coupon. For example, a coupon can be copied to the clipboard of the computing device to use in a purchase. In some embodiments, the selectable indicia 3020 direct the app to the website of the selected business or an associated advertiser, for example, to view more details of the offer or coupon. In some embodiments, a record of the businesses which the user has visited is recorded by the app and transmitted to the server. The records of visits to businesses enable a user's preferences to be learnt such that the app can provide targeted advertising or show businesses that match a user's preferences.

Figure 31:
FIG. 31 illustrates a digital gift card according to an alternative embodiment of the invention including a clickable link for redeeming the card.

FIG. 31 illustrates a digital gift card 3100 according to an alternative embodiment of the invention. Rather than including a bar code that is physically scannable to immediately redeem a card, the digital gift card 3100 includes a clickable link, such as a link associated with the text "Gift Card #426477100". Clicking the link initiates a process for immediately redeeming the gift card 3100 online. For example, according to some embodiments such immediate redeeming means that the gift card 3100 as delivered can be redeemed directly by the recipient as described above concerning physically scannable embodiments, but where such redemption occurs online, and without the need for the recipient to complete a registration process as required in the prior art.

In summary, embodiments of the present invention enable a transaction experience involving a personalised MMS message having a redeemable component to include more of the excitement, timing, spontaneity and warmth of an "in person" transaction. For example, digital gift cards according to some embodiments can be redeemed immediately when opened, and without the need for the gift card recipient to execute tedious registration processes. Further, according to some embodiments, a digital gift card can be timed to be sent and received by a recipient at an exact predetermined moment when the sender believes the excitement of receiving the card will be greatest.

Embodiments of the present invention also provide a personalised MMS message having a redeemable component to a mobile computing device while mitigating security and fraud risks. In particular, embodiments of the present invention provide a fraud and/or security checked message via MMS. The redeemable component of the personalised MMS message can be scanned directly from the message and therefore does not require the recipient to follow URL links that could put the recipient's computing device at risk of viruses, for example, by opening URL links from fraudulent messages or emails.

Embodiments of the present invention also enable a sender and/or receiver to be checked in relation to fraud a non-intrusive manner based on the existence of social media profiles and network scrapes relating to the sender and/or receivers details.

In this specification, the terms "comprises", "comprising" or similar terms are intended to mean a non-exclusive inclusion, such that an apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A method for generating a personalised Multimedia Message Service (MMS) message having a redeemable component, the method comprising:
   receiving, at a multidimensional verification server from a first computing device, a selection of an MMS message product;
   receiving, at the multidimensional verification server from the first computing device, a recipient contact identifier identifying a recipient mobile number;
   performing, via the multidimensional verification server, a security verification of a recipient or sender based on the recipient mobile number or one or more details of the sender received from the first computing device;
   where the security verification is successful, generating, via the multidimensional verification server, based on the selection of the MMS message product, a personalised MMS message having a redeemable component and a personalised image uniquely rendered for the recipient; and
   transmitting, the personalised MMS message to a recipient mobile computing device via a multimedia message service using the recipient mobile number;
   whereby the personalised MMS message is scannable or otherwise immediately redeemable from the recipient mobile computing device to pay for one or more products and/or services, and wherein no authentication of the recipient or recipient mobile computing device is required to redeem the personalised MMS message.

2. The method of claim 1, wherein the recipient contact identifier identifies a Mobile Station International Subscriber Directory Number (MSISDN).

3. The method of claim 1, wherein the personalised MMS message having a redeemable component comprises a digital gift card, voucher, coupon, or advertisement.

4. The method of claim 1, wherein the redeemable component of the personalised MMS message comprises a unique code that is scannable from the recipient mobile computing device to pay for one or more products and/or services.

5. The method of claim 4, wherein the unique code is a barcode or a quick response code.

6. The method of claim 1, wherein the personalised MMS message comprises a picture or video that is personalised for the recipient.

7. The method of claim 1, wherein a personalised component of the personalised MMS message comprises the recipient's name.

8. The method of claim 1, wherein the personalised MMS message having a redeemable component is immediately redeemable by clicking on a Uniform Resource Locator (URL) link displayed on the MMS message.

9. The method of claim 1, wherein the personalised MMS message includes animated graphics such as an animated GIF file.

10. The method of claim 1, wherein the recipient contact identifier comprises a recipient MSISDN.

11. The method of claim 1, wherein the recipient contact identifier identifies a contact for which an associated MSISDN is stored on the multidimensional verification server.

12. The method of claim 2, wherein performing the security verification comprises:
   determining a fraud risk profile score for each of the MSISDN or one or more of the details of the sender.

13. The method of claim 12, wherein the one or more details of the sender comprise one or more of the following: a sender MSISDN; a sender email address; and sender payment details.

14. The method of claim 13, wherein determining the fraud risk profile score comprises one or more of the following:
   comparing the sender MSISDN with one or more records of MSISDNs used in relation to fraud or associated with poor credit ratings;
   comparing the sender email address with one or more records of email addresses used in relation to fraud and/or associated with poor credit ratings;
   comparing an internet protocol (IP) address of the first computing device with a source IP address of packets received at the multidimensional verification server from the first computing device;
   comparing the sender payment details with one or more records of payment details used in relation to fraud or associated with poor credit ratings; and
   transmitting a request to a financial institution system to check whether the payment details are valid.

15. The method of claim 1, further comprising receiving, at the multidimensional verification server, a date or time at which to transmit the personalised MMS message to the recipient mobile computing device.

16. The method of claim 15, further comprising scheduling the generation and transmission of the personalised MMS message for the date or time.

17. The method of claim 4, wherein the personalised MMS message is uniquely trackable based on: a) the code presented; b) the number the MMS message is sent to; and c) unique attributes of the uniquely rendered personalised image.

18. A non-transitory computer readable medium storing computer readable code components that when selectively executed by a processor cause the following:
   receiving, at a multidimensional verification server from a first computing device, a selection of a Multimedia Message Service (MMS) message product;
   receiving, at the multidimensional verification server from the first computing device, a recipient contact identifier identifying a recipient mobile number;

performing, via the multidimensional verification server, a security verification of a recipient or sender based on the recipient mobile number or one or more details of the sender received from the first computing device;

where the security verification is successful, generating, via the multidimensional verification server, based on the selection of the MMS message product, a personalised MMS message having a redeemable component and a personalised image uniquely rendered for the recipient; and transmitting, the personalised MMS message to a recipient mobile computing device via a multimedia message service (MMS) using the recipient mobile number;

whereby the personalised MMS message is scannable or otherwise immediately redeemable from the recipient mobile computing device to pay for one or more products and/or services and wherein no authentication of the recipient or recipient mobile computing device is required to redeem the personalised MMS message.

19. A multidimensional verification server for generating a personalised Multimedia Message Service (MMS) message having a redeemable component, the multidimensional verification server comprising:

a processor configured to:

receive, from a first computing device, a selection of an MMS message product;

receive, from the first computing device, a recipient contact identifier identifying a recipient mobile number;

perform a security verification of a recipient or sender based on the recipient mobile number or one or more details of the sender received from the first computing device; and where the security verification is successful, generate, based on the selection of the MMS message product, a personalised MMS message having a redeemable component and a personalised image uniquely rendered for the recipient; and initiate transmission of the personalised MMS message to a recipient mobile computing device via a multimedia message service using the recipient mobile number; and memory configured to store computer readable code components that are executable by the processor;

whereby the personalised MMS message is scannable or otherwise immediately redeemable from the recipient mobile computing device to pay for one or more products and/or services and wherein no authentication of the recipient or recipient mobile computing device is required to redeem the personalised MMS message.

* * * * *